(12) United States Patent
Kushida et al.

(10) Patent No.: US 6,483,467 B2
(45) Date of Patent: Nov. 19, 2002

(54) ANTENNA DISPOSITION STRUCTURE FOR MOTORCYCLE

(75) Inventors: Kazumitsu Kushida, Saitama (JP); Sadanao Ichimi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/824,230

(22) Filed: Apr. 3, 2001

(65) Prior Publication Data

US 2002/0003501 A1 Jan. 10, 2002

(30) Foreign Application Priority Data

Apr. 3, 2000 (JP) ........................................ 2000-101486
Jul. 21, 2000 (JP) ........................................ 2000-220785

(51) Int. Cl.$^7$ .............................................. H01Q 1/32
(52) U.S. Cl. ........................................ 343/713; 343/711
(58) Field of Search ................................ 343/711, 712, 343/713, 721, 722

(56) References Cited

U.S. PATENT DOCUMENTS

| | | | | |
|---|---|---|---|---|
| 3,646,561 A | * | 2/1972 | Clarke | 343/711 |
| 4,132,994 A | * | 1/1979 | Caldwell | 343/713 |
| 4,311,335 A | * | 1/1982 | Winiecki | 296/78.1 |
| 5,889,496 A | * | 3/1999 | Maas | 343/791 |
| 6,191,751 B1 | * | 2/2001 | Johnson | 343/834 |

FOREIGN PATENT DOCUMENTS

| | | |
|---|---|---|
| JP | U6391991 | 6/1988 |
| JP | A11352221 | 12/1999 |

* cited by examiner

Primary Examiner—Tan Ho
(74) Attorney, Agent, or Firm—Birch, Stewart, Kolasch & Birch, LLP

(57) ABSTRACT

An antenna disposition structure is suitable for a motorcycle. An antenna is disposed in a front cover in such a manner as to be disposed over a headlamp and forwardly from a virtual slant line connecting the center of a handlebar to an axle of a front wheel. A driver, who functions as a radio wave absorbing body, acts to weaken radio waves. However, since the antenna is disposed forwardly from the slant line, it is possible to prevent the effect of absorption of radio waves by a driver and to prevent reductions in electromagnetic fields in the vertical and horizontal directions.

20 Claims, 12 Drawing Sheets

ANTENNA DISPOSITION STRUCTURE FOR MOTORCYCLE

BACKGROUND OF THE INVENTION

1. Field of the Invention

The present invention relates to an improved antenna disposition structure for a motorcycle.

2. Description of the Background Art

A technique of performing radio communication between vehicles for detecting the presence of another vehicle has been disclosed, for example, in Japanese Patent Laid-open No. Hei 11-352221 entitled "Movable Body Detecting System". According to this technique, the vehicle concerned transmits a vehicle identification (ID) code signal and receives a vehicle identification (ID) code signal transmitted by a different vehicle, thereby recognizing the presence of the different vehicle and measuring a distance therebetween.

The transmission and reception of such a vehicle identification (ID) code signal requires radio communication via an antenna. The mounting position of an antenna on a vehicle is significantly restricted, if the vehicle is configured as a motorcycle having a small vehicular body.

An antenna disposition structure is disclosed, for example, in Japanese Utility Model Laid-open No. Sho 63-91991 entitled "Foldable Antenna for Motorcycle". As shown in FIG. 1 of that document, a foldable antenna is provided on a portion near a rear carrier of a large-sized motorcycle in such a manner as to extend upwardly therefrom.

In order to efficiently transmit a large amount of data including a vehicle identification (ID) code signal, a signal indicating a running state of the vehicle, and a coordinate signal indicating a position of a running vehicle, in a short time by using radio waves, the wavelengths of the radio waves may desirably be shorter. In actual use, microwaves having ultra high or higher frequencies have been desirably used for radio communication between vehicles. Such microwaves, however, have a very strong rectilinear propagation property, and therefore, they are liable to be shielded by obstacles present in the rectilinear path of the microwaves.

If an antenna is provided behind a passenger, for example, as disclosed in Japanese Utility Model Laid-open No. Sho 63-91991, microwaves traveling from the front of the vehicle to the antenna are shielded by a windshield and the passenger. In this way, from the viewpoint of reception of signals transmitted from the front of the vehicle via microwaves, the disposition of an antenna behind a passenger is undesirable.

SUMMARY OF THE INVENTION

It is therefore an object of the present invention to provide an antenna disposition structure suitable for a motorcycle. To achieve the above object, an antenna disposition structure is provided for a motorcycle including an antenna for radio communication, wherein the antenna is disposed over a headlamp and forwardly from a virtual slant line connecting the center of a handlebar to an axle of a front wheel.

With this configuration, the antenna can be sufficiently separated from a driver of the motorcycle. A driver, who functions as a body absorbing radio waves, acts to weaken radio waves. According to this configuration, however, since the antenna is disposed forwardly from the slant line, it is possible to prevent the effect of absorption of radio waves by a driver and to prevent reductions in electromagnetic fields in the vertical and horizontal directions.

The antenna provided over the headlamp is located at a sufficiently high position, and such an antenna can ensure good line-of-sight of a large number of objects to or from which radio waves are transmitted or received without interference with obstacles on a road. As a result, the reliability of communication by means of the antenna can be enhanced.

The antenna may be covered with a front cover made of resin or a resin-molded product equivalent thereto. With this configuration, the antenna can be mounted by making effective use of a space in the front cover, and the front cover formed of a resin-molded product allows the passing of radio waves therethrough, and can desirably protect the antenna. For example, the front cover prevents the antenna from being damaged due to rain and wind and being broken due to contact with another movable body. Further, since the antenna is not exposed from the front cover, it is possible to keep a good external appearance of the vehicle.

The antenna may be mounted on an upper edge portion of the headlamp. With this configuration, since the antenna is mounted on the upper edge portion of the headlamp, a reflection body such as a metal from which radio waves are reflected, and/or an absorption body such as a human being which absorbs radio waves, are not present in the surroundings of the antenna, particularly, in front of and above the vehicle. As a result, it is possible to prevent a reduction in intensity of radio waves transmitted or received by the antenna.

A horizontal base may be provided on an upper edge portion of the headlamp or over the headlamp, and the antenna is mounted on the mounting base. With this configuration, the antenna can be easily mounted to the headlamp irrespective of the shape of the headlamp. As a result, one kind of antenna can be applied to various kinds of motorcycles.

The front cover may be provided under the handlebar, and a containing space provided in the front cover at a position over the headlamp. An opening communicated to the containing space is provided in the front cover, the opening being covered with a lid. A horizontal mounting base is provided in the containing space on an upper edge portion of the headlamp or over the headlamp, and the antenna is mounted on the mounting base. With this configuration, since the containing space is provided in the front cover, the antenna can be mounted by making effective use of the space in the front cover.

Since the front cover is made from a resin, it can protect the antenna while allowing the passing of radio waves therethrough. For example, the front cover prevents the antenna from being damaged due to rain and wind and being broken due to contact with another movable body. Since the antenna is disposed at a position higher than the headlamp, it can receive radio waves without interference with obstacles on a road. As a result, the reliability of communication by means of the antenna can be enhanced. Further, since the opening of the containing space is covered with the front lid, the maintenance of the antenna in the containing space can be easily performed.

The antenna may have a forward directivity with respect to the running direction of the motorcycle. With this configuration, if the antenna is taken as an antenna for radio communication between vehicles, since the antenna has the forward directivity, it can achieve desirable radio communication with another vehicle running ahead of the vehicle concerned.

The antenna may be composed of a first antenna and a second antenna disposed adjacently to each other, wherein the first antenna has a forward directivity with respect to the running direction of the motorcycle, and the second antenna has an upward directivity with respect to the running direction of the motorcycle. With this configuration, if the first antenna is a transmitting/receiving antenna for radio communication with another vehicle, and the second antenna is a receiving antenna for the GPS, it is possible to desirably perform radio communication with another vehicle running ahead of the vehicle concerned by the first antenna and desirably receive radio waves from a number of artificial satellites by the second antenna, and hence to obtain accurate positional information of the vehicle concerned.

Further, since the first and second antennas are disposed adjacent to each other, they can be contained in a compact containing space. Also, if the first and second antennas are covered with a protective cover for improving the weather resistance, the protective cover can be miniaturized and thereby can be made inconspicuous. Since the first and second antennas are not exposed and further the protective cover is made inconspicuous as described above, it is possible to maintain a good external appearance of the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Embodiments of the present invention will now be described with reference to the accompanying drawings.

Figure 1:
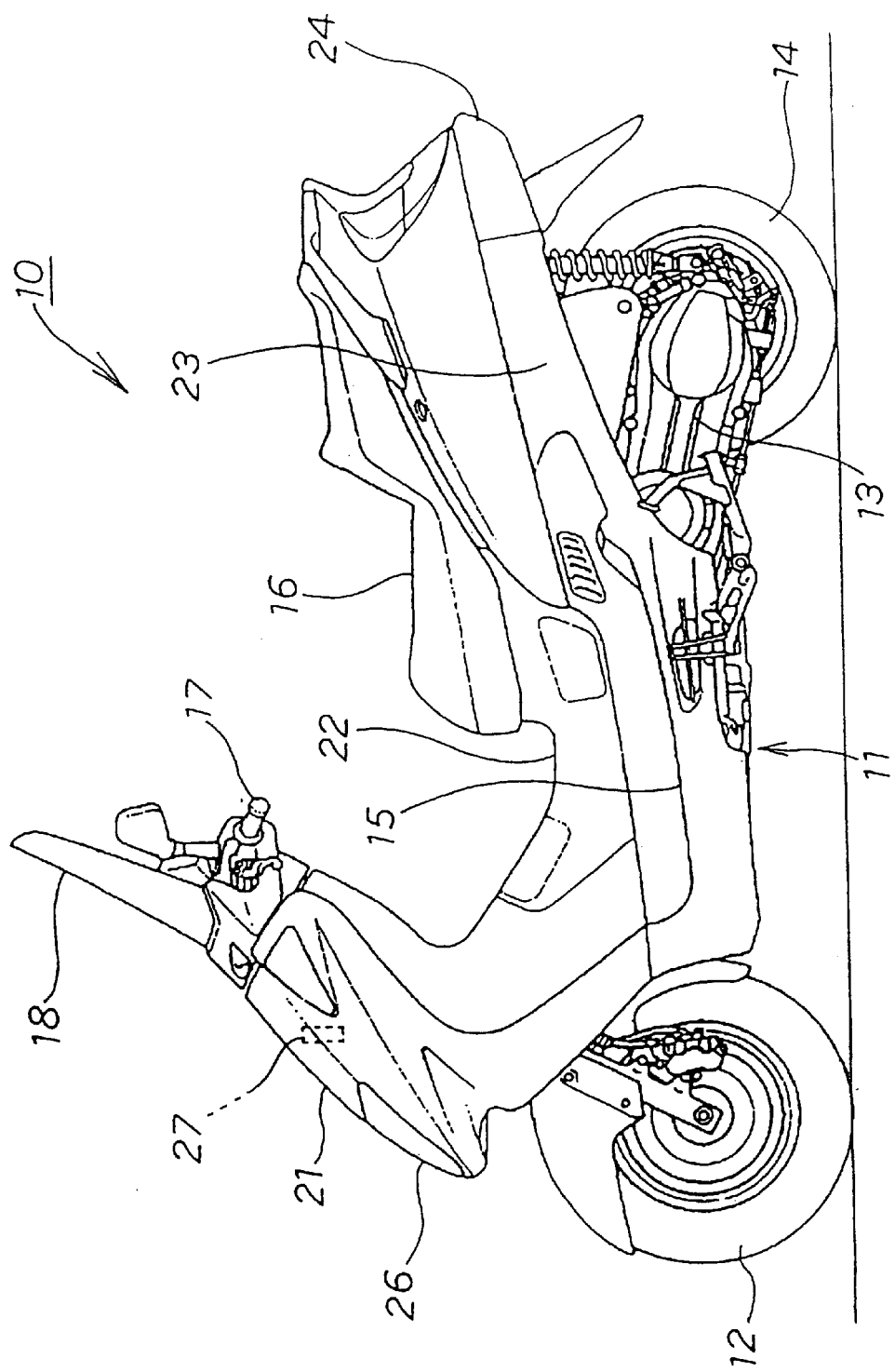
FIG. 1 is a side view of a motorcycle including an antenna according to a first embodiment of the present invention.

FIG. 1 is a side view of a motorcycle including an antenna according to a first embodiment of the present invention. A scooter-type motorcycle 10 representative of the motorcycle according to the present invention is configured such that a front wheel 12 is provided on a front portion of a vehicular body 11, and a rear wheel 14 as a drive wheel is vertically movably mounted on a rear portion of the vehicular body 11 via a power swing unit 13.

Steps 15 are disposed on both sides of a lower center portion of the vehicular body 11, and a tandem seat 16 is disposed on an upper portion of the vehicular body 11. A handlebar 17 is disposed on the front portion of the vehicular body 11, and a transparent windshield 18 is raised from the handlebar 17. The vehicular body 11 is covered with covers such as a front cover 21, a center cover 22, side covers 23, and a rear center cover 24.

The motorcycle 10 includes an antenna 27 positioned over a headlamp 26 and contained in the front cover 21. The disposition structure of the antenna 27 will be described with reference to FIG. 2.

Figure 2:
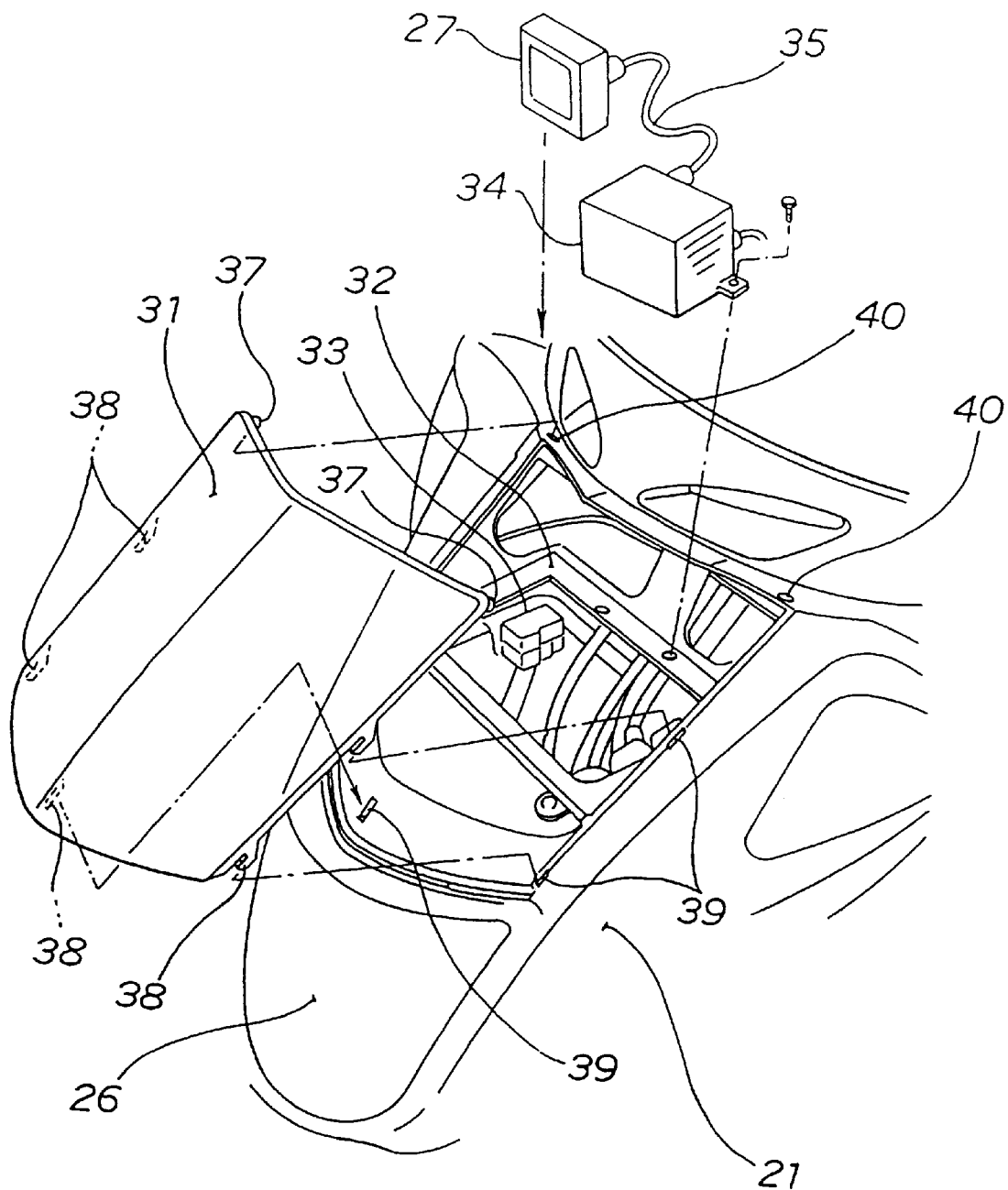
FIG. 2 is a structure for containing the antenna according to the first embodiment of the present invention.

FIG. 2 is a view showing a structure for containing the antenna according to the first embodiment of the present invention. A portion of the front cover 21 positioned over the headlamp 26 has a cover structure which is openably closed by a removable front lid 31. A horizontal bracket 32 is provided in an area (containing area in the front cover 21) covered with the front lid 31. A transmitter/receiver 34 for radio communication is mounted, together with electrical equipment 33 such as a coupler, on the bracket 32. The antenna 27 is connected to the transmitter/receiver 34 via a harness 35, and is contained in the containing area in the front cover 21. Thereafter, the containing area is covered with the front lid 31.

The front lid 31 is a resin-molded product having two pins 37 provided at right and left points on an upper edge of the front lid 31 in such a manner as to extend downwardly therefrom. Three claws 38 are provided at right, left and central points on a lower edge of the front lid 31. Two claws 38 are provided at central points on right and left edges of the front lid 31. On the other hand, an edge portion, around the front lid 31, of the front cover 21 has five lock holes 39 corresponding to the claws 38 and two holes 40 corresponding to the pins 37. The front lid 31 is simply mounted to the front cover 21 by hanging the claws 38 from the lock holes 39 and also fitting the pins 37 in the holes 40.

Figure 3:
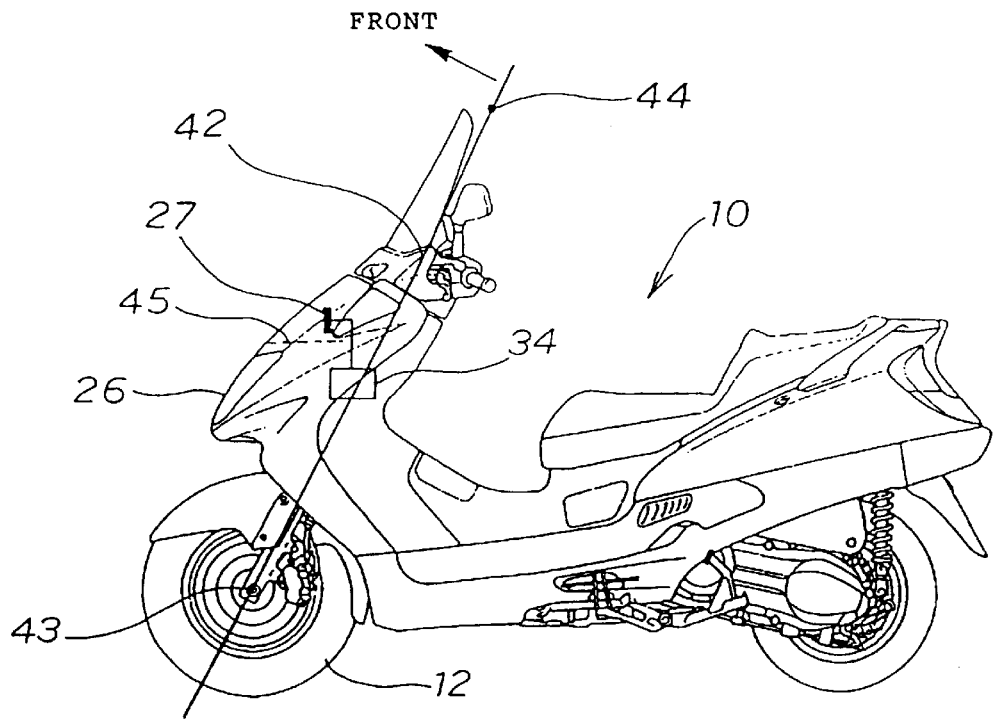
FIG. 3 is a side view of the motorcycle including the antenna according to the first embodiment of the present invention.

FIG. 3 is a side view of the motorcycle including the antenna according to the first embodiment of the present invention. The antenna 27 is mounted on the motorcycle 10 in such a manner as to be contained in the front cover 21, disposed in a space over the headlamp 26, and disposed forwardly from a virtual slant line 44 connecting the center 42 of the handlebar 17 to an axle 43 of the front wheel in the forward movement direction of the motorcycle.

Figure 4:
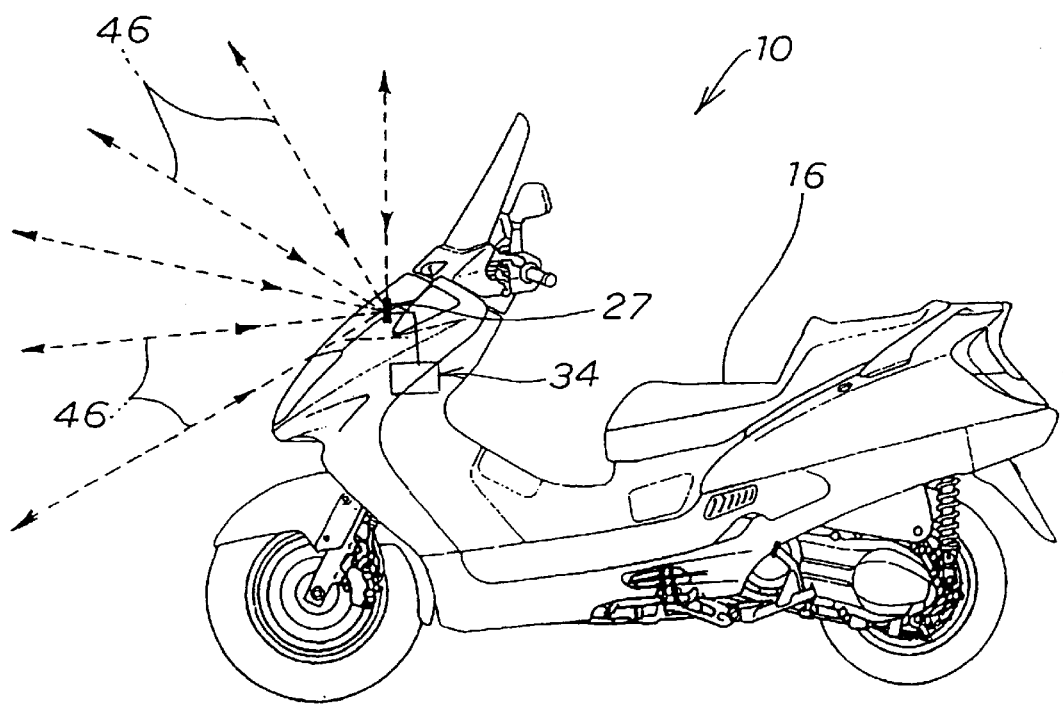
FIG. 4 is a view illustrating a function of the antenna according to the first embodiment of the present invention.

In FIG. 4, reference numeral 45 designates a film on which a metal is vapor-deposited. The film 45 is stuck on a portion under the antenna 27 for shielding radio waves reflected from a road surface.

The requirement that the antenna 27 is contained in the front cover 21 is advantageous in that the antenna 27 can be mounted by making effective use of the space in the front cover 21. The front cover 21, which is formed of a resin-molded product, does not shield the passing of radio waves. The front cover 21 also functions as a member capable of significantly, desirably protecting the antenna 27. For example, the front cover 21 prevents the antenna 27 from being damaged due to rain and wind and being broken due to contact with another movable body. Further, since the antenna 27 is not exposed from the front cover 21, it does not impair an external appearance of the vehicular body.

The requirement that the antenna 27 is disposed over the headlamp 26 is advantageous in that the antenna 27 can be located at a sufficiently high position. The antenna 27 located at a high position can ensure good line-of-sight of a large number of objects to or from which radio waves are transmitted or received without interference with obstacles on a road surface. As a result, the reliability of communication by means of the antenna 27 can be enhanced.

The requirement that the antenna 27 is disposed forwardly from the slant line 44 is advantageous in that the antenna 27 is sufficiently separated from a driver of the motorcycle. A driver, who functions as a body absorbing radio waves, acts to weaken radio waves. In this regard, since the antenna 27 is disposed forwardly from the slant line 44, it is possible to prevent the effect of absorption of radio waves by a driver and to prevent reductions in electromagnetic fields in the vertical and horizontal directions.

FIG. 4 is a view illustrating the function of the antenna according to the first embodiment of the present invention, particularly showing a state of radio waves 46 radially transmitted or received from or to the antenna 27. As is apparent from this Figure, the radio waves 46 spread forwardly from the antenna 27, and therefore, do not reach to the tandem seat 16 and the rear portion of the vehicular body 11. Accordingly, a driver and/or a passenger sitting on the tandem seat 16, and/or a baggage loaded on the rear portion of the vehicular body do not interfere the radio waves.

Since the transmission/reception of the radio waves 46 is not blocked by a driver and the like, microwaves can be used as the radio waves 46. The use of microwaves allows the adoption of a so-called flat antenna as the antenna 27. As the flat antenna, there may be used an extremely thin type antenna such as a film antenna or a phased array type antenna allowing phase difference feeding. Such a film antenna or phased array antenna is advantageous in that the directivity of the antenna is made largely variable, although the antenna is a small-sized fixed type without any movable portion.

Figure 5:
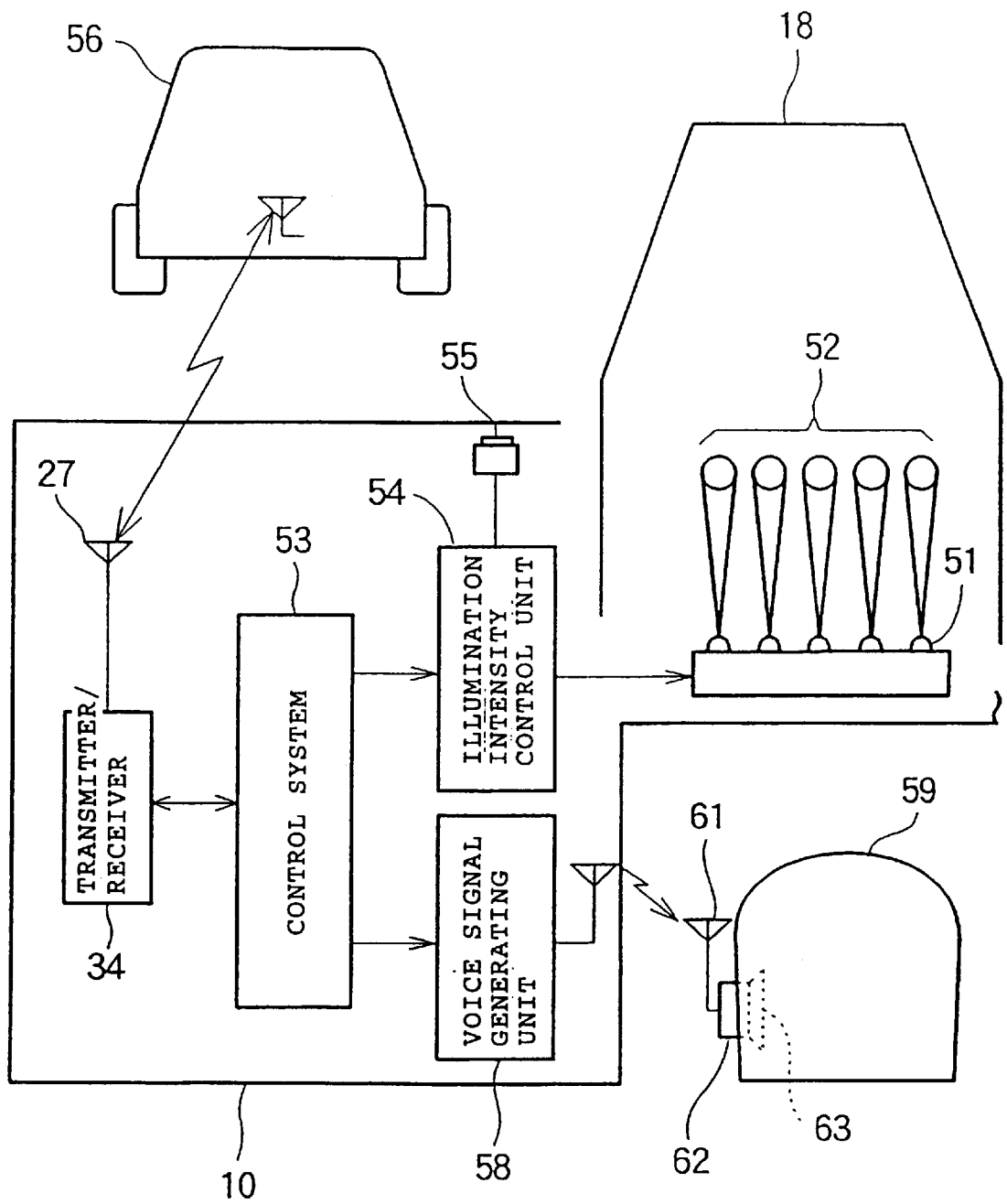
FIG. 5 is a view showing an application example of the antenna according to the first embodiment of the present invention.

FIG. 5 is a view showing an application example of the antenna according to the first embodiment of the present invention. The motorcycle 10 includes the antenna 27, the transmitter/receiver 34, a control system 53, an illumination intensity control unit 54, and an illumination intensity sensor 55. The transmitter/receiver 34 receives radio waves transmitted from another movable body 56 via the antenna 27, and the control system 53 analyzes the information thus received. If it is determined by the control system 53 that the motorcycle 10 could possibly collide with the movable body 56, light emitting devices 51 are turned on via the illumination intensity control unit 54. At this time, a horizontal row of images 52 formed by the light emitting devices 51 emerge on a windshield 18. At the same time, the control system 53 transmits a voice signal by radio transmission via a voice signal generating unit 58. A miniature receiver 62 receives the voice signal via a miniature antenna 61 additionally provided on a helmet 59, and a speaker 63 built in the helmet 59 generates an alarm sound.

The illumination intensity sensor 55 detects an intensity of illumination in the surroundings, and the illumination intensity control unit 54 adjusts an output of each of the light emitting devices 51, to adjust the brightness of the image 52 formed by the light emitting device 51. With this adjustment, the images 52 are made visible in cloudless or cloudy weather, or at night.

Figure 6:
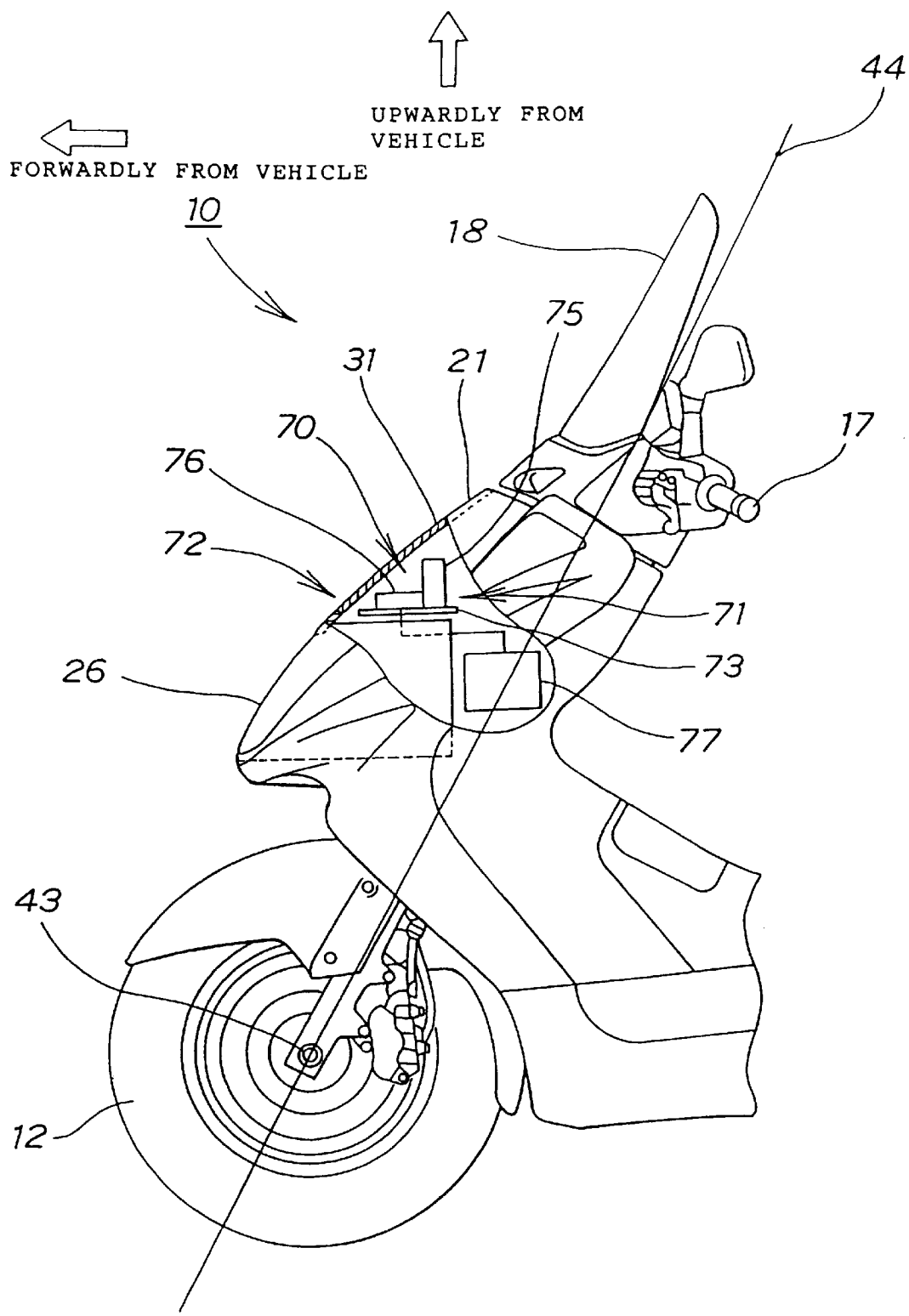
FIG. 6 is a side view of a portion of a motorcycle including an antenna according to a second embodiment of the present invention.

FIG. 6 is a side view of a portion of a motorcycle including an antenna according to a second embodiment of the present invention. In this Figure, parts corresponding to those in the first embodiment are designated by the same reference numerals, and the overlapped description thereof is omitted.

A motorcycle 10 shown in FIG. 6 is basically configured such that an antenna 70 is disposed over a headlamp 26 and forwardly from a virtual slant line 44 connecting the center of a handlebar 17 to an axle 43 of a front wheel. To be more specific, a front cover 21 is provided under the handlebar 17, and a containing space 71 is provided in the front cover 21 at a position over the headlamp 26. An opening 72 communicated to the containing space 71 is formed in the front cover 21, and the opening 72 is openably covered with a front lid 31. A horizontal mounting base 73 is provided in the containing space 71 in such a manner as to be placed on an upper edge of the headlamp 26 or over the headlamp 26, and the antenna 70 is mounted on the mounting base 73. In this way, the antenna 70 is disposed over the headlamp 26 and is contained in the front cover 21.

The antenna 70 is composed of a first antenna 75 and a second antenna 76, which are disposed adjacently to each other. The first antenna 75 is an antenna having a forward directivity with respect to the running direction of the vehicle for radio transmission between the vehicle concerned and another vehicle, particularly, a vehicle running ahead of the vehicle concerned. The second antenna 76 is a reception antenna for a GPS (Global Positioning System), which has an upward directivity with respect to the running direction of the vehicle for receiving radio waves from artificial satellites. In FIG. 6, reference numeral 77 designates a receiver for the GPS.

The GPS is one type of navigation system for obtaining a current position of a car and a running route from the current position to a destination. More specifically, the GPS is a satellite navigation system in which a position of the vehicle concerned is determined by calculations based on differences between arrival times of radio waves having time signals emitted from a plurality of artificial satellites.

Figure 7:
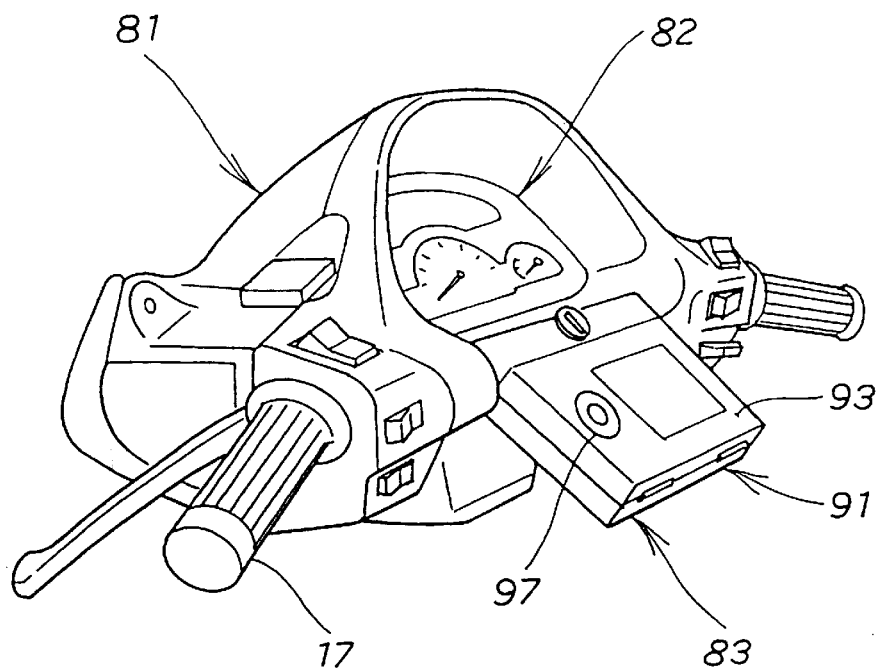
FIG. 7 is a perspective view of a portion around a handlebar of the motorcycle including the antenna according to the second embodiment of the present invention.

FIG. 7 is a perspective view of a portion around a handlebar of the motorcycle including the antenna according to the second embodiment of the present invention. Referring to FIG. 7, a handle cover 81 for covering a central portion of the handlebar 17 is disposed behind a windshield 18 (which is shown in FIG. 6). The handle cover 81 is provided with a combination meter 82, various switches such as a starter switch, a lighting switch, and a turn signal switch, and an information storage/display unit 83 constituting the GPS.

The information storage/display unit 83 displays a position, a direction, a movement distance, a movement speed, and the like of the vehicle concerned, which are obtained by calculations based on signals received by the receiver 77 for the GPS (see FIG. 6), and performs the storage, retrieval, display, and the like of map information.

Figure 8:
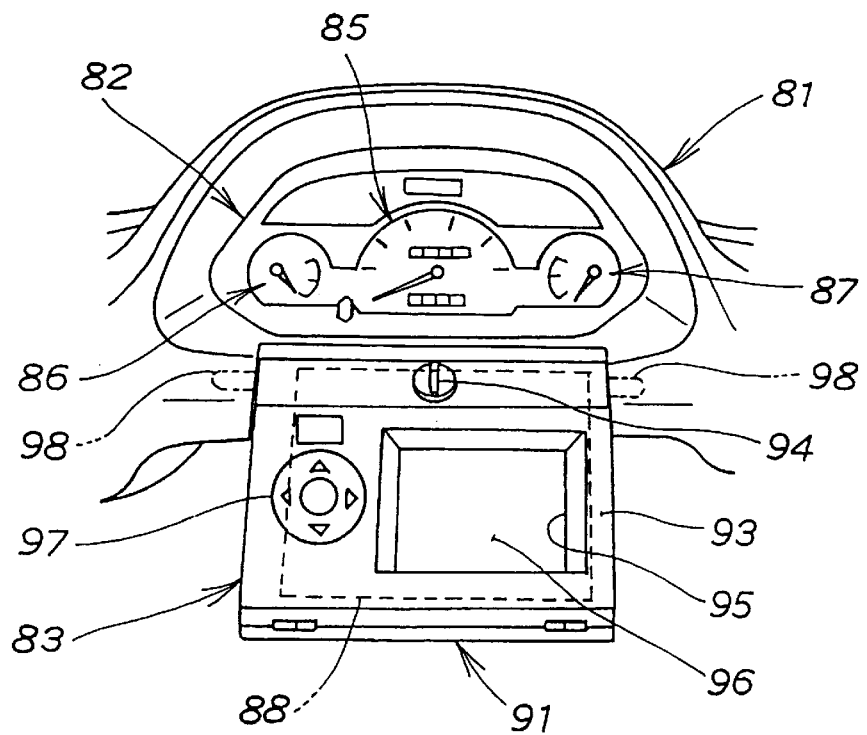
FIG. 8 is a front view of a portion around the handlebar of the motorcycle including the antenna according to the second embodiment of the present invention.

FIG. 8 is a front view of a portion around the handlebar of the motorcycle including the antenna according to the second embodiment of the present invention. Referring to this Figure, the combination meter 82 includes a speed meter 85 disposed at a central portion of the combination member 82, and a fuel meter 86 and a water temperature meter 87 disposed on both sides of the speed meter 85.

The information storage/display unit 83 makes use of a storage function and a display function of a PDA (Personal Digital Assistant) 88. The PDA is contained in a case 91 for enhancing the weather resistance. In the case where the motorcycle 10 is not used or the GPS is not used, the PDA 88 can be removed from the case 91. The PDA 88 thus removed can be used as its original application, that is, as an electronic notebook for schedule management or memorandum, or used for a portable GPS capable of inputting data (addresses, telephone numbers, etc. as personal information) via a personal computer, or performing downloading of data (current map information, current road information, resort information, etc.) via the Internet.

In FIG. 8, reference numeral 93 designates a lid portion provided on the case 91. The lid portion 93 is opened by turning a knob 94, and the PDA 88 is contained in or taken from the case 91. Reference numeral 95 designates a window portion provided on the lid portion 93. A display 96 provided on the PDA 88 is visible through a glass plate or an acrylic resin plate fitted in the window portion 95. Reference numeral 97 designates a switch used for moving a cursor displayed on the display 96 or selecting the content displayed on the display 96. Reference numeral 98 designates each of two swing shaft portions for swingably mounting the information storage/display unit 83 on the handle cover 81.

Figure 9:
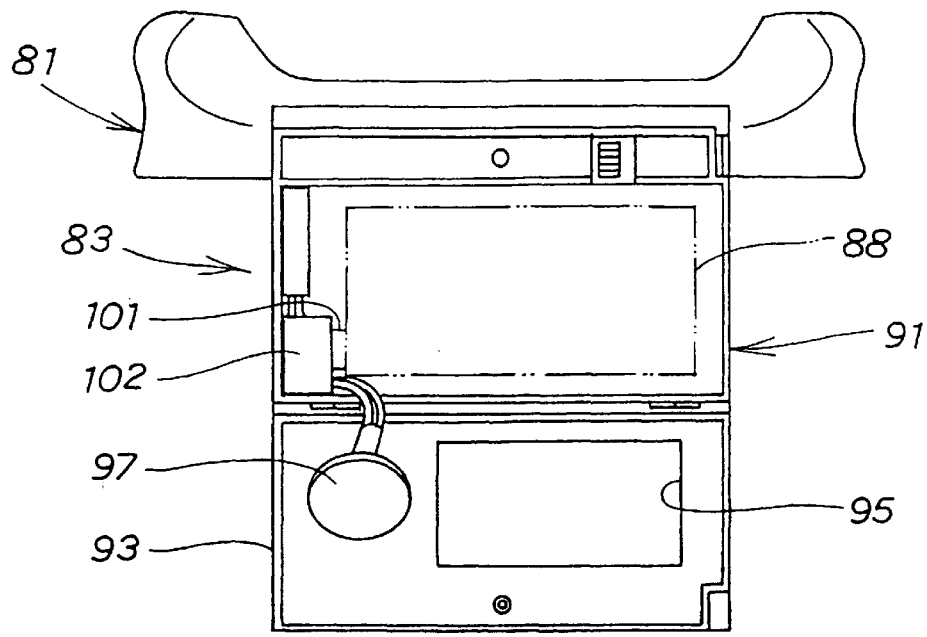
FIG. 9 is a first illustrative view of a GPS information storage/display unit using the antenna according to the second embodiment of the present invention.

FIG. 9 is a first illustrative view of a GPS information storage/display unit using the antenna according to the second embodiment of the present invention. As shown in this Figure, in the case of using the information storage/display unit 83, the lid portion 93 provided on the case 91 of the information storage/display unit 83 is opened. The case 91 includes a connector 101 to which input and output terminals of the PDA 88 are to be connected, and a relay unit 102 for relaying a signal from the connector 101 to the receiver 77 for the GPS (see FIG. 6). In the case of using the PDA 88 as a single device such as an electronic notebook, the PDA 88 may be removed from the connector 101.

Figure 10:
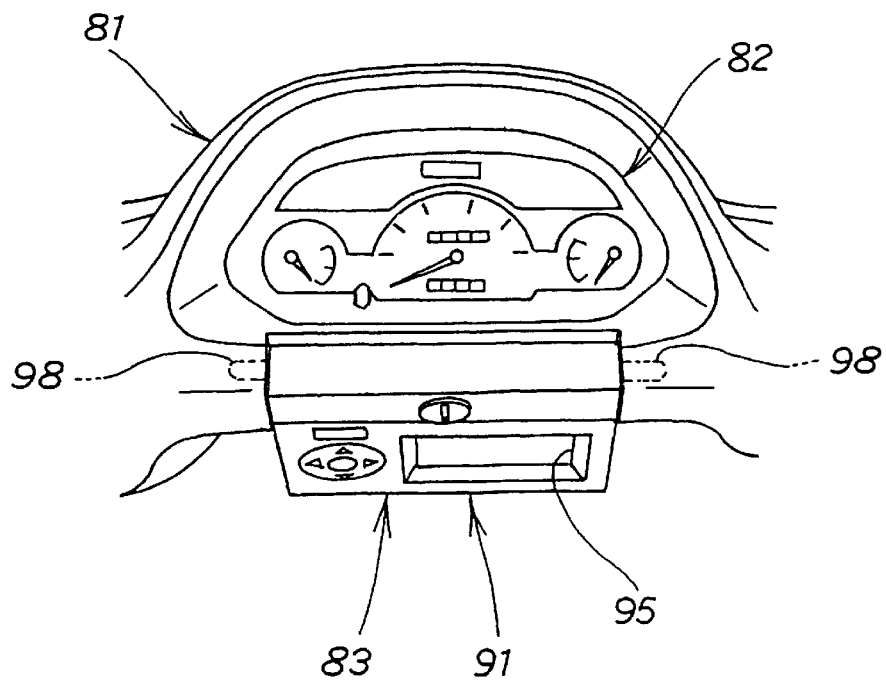
FIG. 10 is a second illustrative view of the GPS information storage/display unit using the antenna according to the second embodiment of the present invention.

FIG. 10 is a second illustrative view of the GPS information storage/display unit using the antenna according to the second embodiment of the present invention. As shown in this Figure, in the case of not using the information storage/display unit 83, a lower portion of the information storage/display unit 83 is swung around the swing shaft portions 98 to the depth side, to turn the window portion 95 side obliquely, downwardly. With such a state, a driver is allowed to intently turn his or her eyes on the meters 85, 86 and 87 of the combination meter 82.

Figure 11:
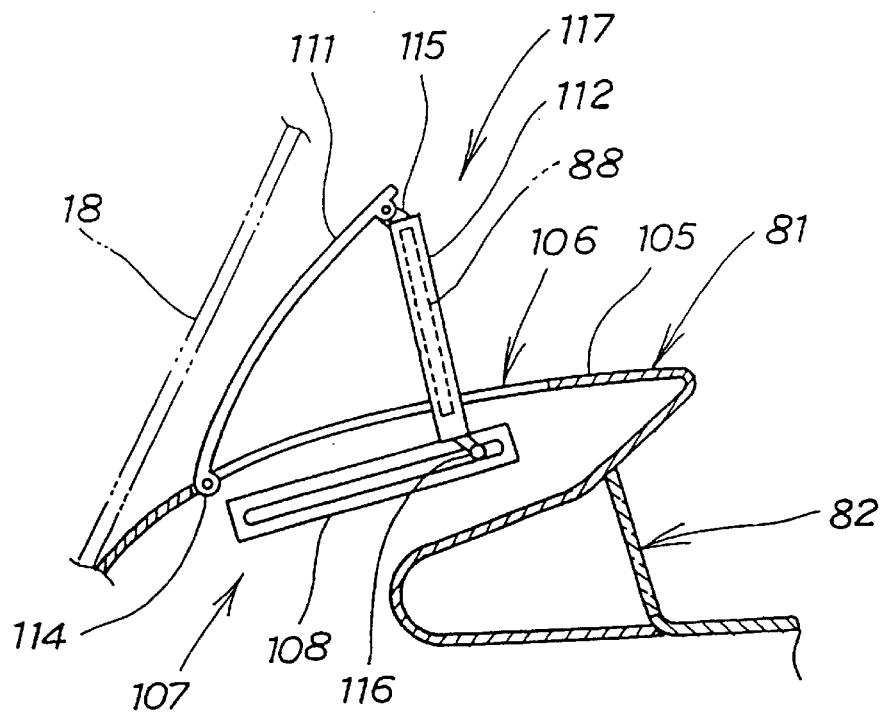
FIG. 11 is a first sectional view of a modification of the GPS information storage/display unit using the antenna according to the second embodiment of the present invention.

FIG. 11 is a first sectional view showing a modification of a GPS information storage/display unit using the antenna according to the second embodiment of the present invention. An opening 106 is formed in an upper surface 105 of the handle cover 81 behind the windshield 18, to form a containing space 107 in the handle cover 81. Two rails 108 (one of which, disposed on the depth side, is not shown) are provided in the containing space 107 communicated to the opening 106. A lid portion 111 is provided to cover the opening 106. One end of a case 112 is movably mounted on the rails 108, and the other end of the case 112 is swingably mounted to an end of the lid portion 111. The PDA 88 is contained in the case 112. In this Figure, reference numeral 114 designates a hinge for openably and closably mounting the lid portion 111 to the handle cover 81. Reference numeral 115 is a hinge for swingably mounting the case 112 to the lid portion 111, and reference numeral 116 is a slide member for movably mounting the case 112 to the rails 108.

In this Figure, there is shown a GPS working state in which an information storage/display unit 117 composed of the PDA 88 contained in the case 112 projects upwardly from the opening 106 formed in the handle cover 81.

Figure 12:
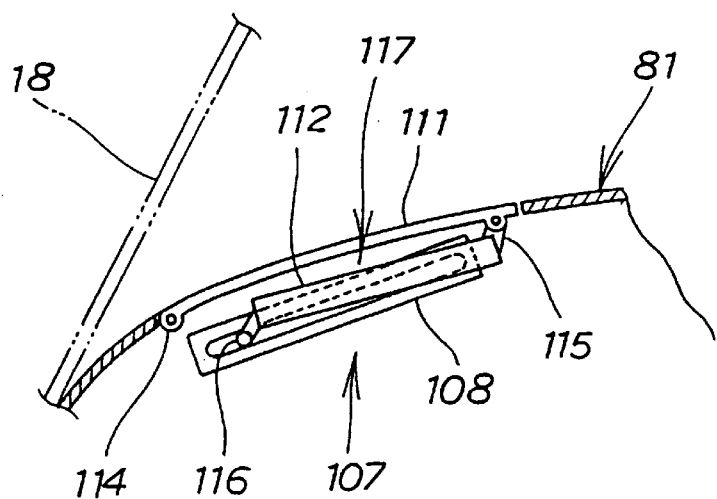
FIG. 12 is a second sectional view of the modification of the GPS information storage/display unit using the antenna according to the second embodiment of the present invention.

FIG. 12 is a second sectional view showing a modification of the GPS information storage/display unit using the antenna according to the second embodiment of the present invention. In this Figure, there is shown a state in which the one end of the case 112 is moved to the windshield 18 side along the rails 108, to move downwardly the other end of the case 112 together with the end of the lid portion 111, whereby the information storage/display unit 117 is contained in the containing space 107 in the handle cover 81 and the lid portion 111 is closed.

As described above, particularly, with reference to FIG. 6, the second embodiment of the present invention is characterized in that the front cover 21 is provided under the handlebar 17, and the containing space 17 is provided in the front cover 21 at a position over the headlamp 26. The opening 72 communicated to the containing space 71 is formed in the front cover 21 and is covered with the front lid 31. The horizontal mounting base 73 is provided, in the containing space 71, on the upper edge portion of the headlamp 26 or over the headlamp 26, and the antenna 70 is mounted on the mounting base 73.

Since the containing space 71 is provided in the front cover 21, the antenna 70 can be mounted by making effective use of the space in the front cover 21. The front cover 21 made from a resin can protect the antenna 70 while allowing the passing of radio waves therethrough. For example, the front cover 21 prevents the antenna 70 from being damaged due to rain and wind and being broken due to contact with another movable body.

Since the antenna 70 is disposed at a position higher than the headlamp 26, it can receive radio waves without interference with obstacles on a road surface. As a result, the reliability of communication by means of the antenna 70 can be enhanced. Further, since the opening 72 of the containing space 71 is covered with the front lid 31, the maintenance for the antenna 70 in the containing space 71 can be easily performed.

Figure 13:
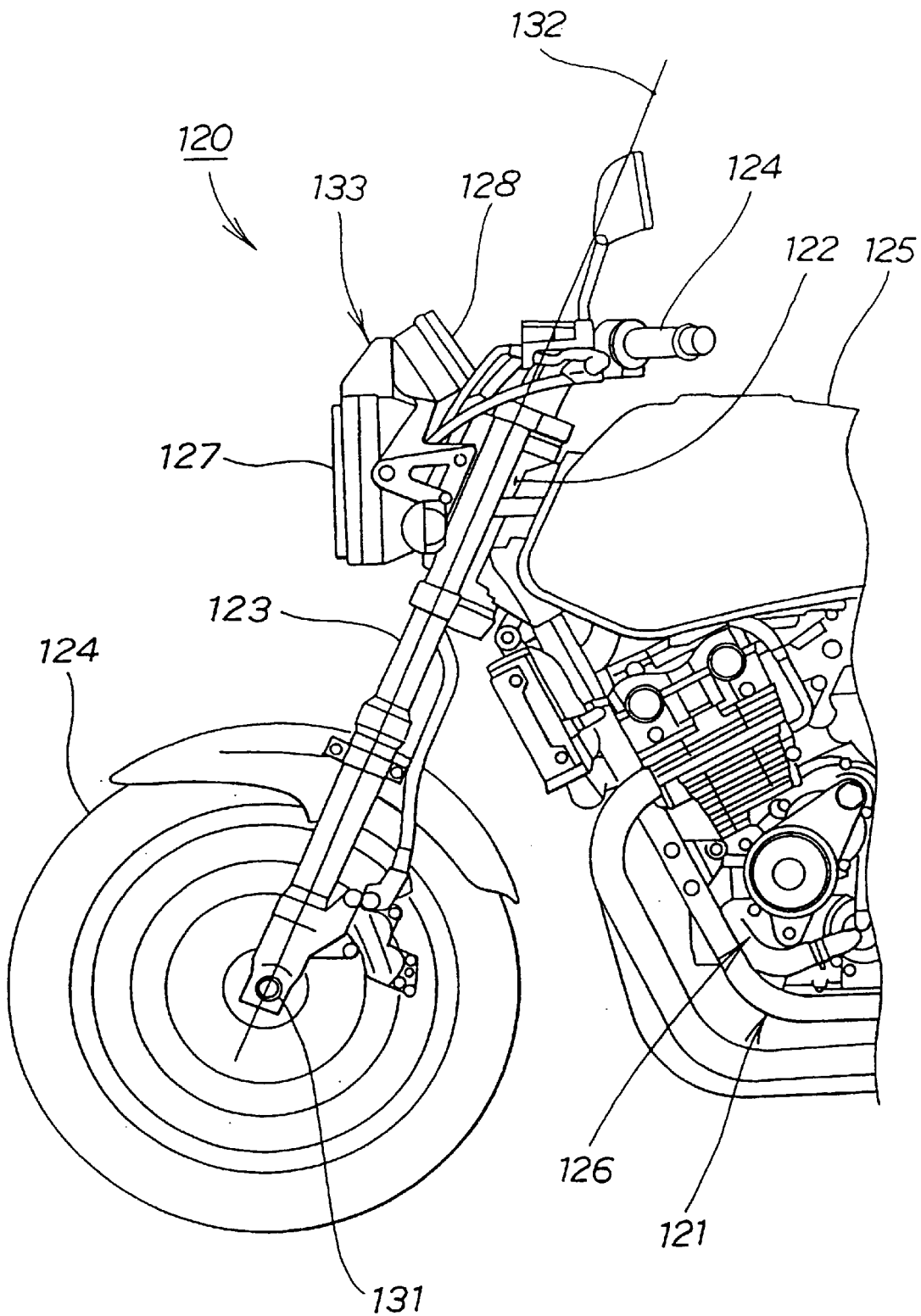
FIG. 13 is a side view of a portion of a motorcycle including an antenna according to a third embodiment of the present invention.

FIG. 13 is a side view of a portion of a motorcycle including an antenna according to a third embodiment of the present invention. A motorcycle 120 shown in FIG. 13 is configured such that a head pipe 122 is mounted on a front portion of a body frame 121. A front fork 123 is steerably mounted on the head pipe 122. A front wheel 124 is rotatably mounted to lower ends of the front fork 123. A handlebar 124 is mounted on an upper portion of the front fork 123. A fuel tank 125 is disposed behind the head pipe 122, and an engine 126 is disposed under the fuel tank 125. In particular, the motorcycle 120 is characterized in that the headlamp 127 is disposed in an uncovered state. In addition, reference numeral 128 designates a meter, and reference numeral 131 is an axle of the front wheel.

In this motorcycle 120, an antenna 133 composed of an antenna for communication with another vehicle and an antenna for a GPS is disposed over the headlamp 127 and forwardly from a virtual slant line 132 connecting the center of the handlebar 124 to the axle 131 of the front wheel. More specifically, the antenna 133 is mounted on an upper edge portion of the headlamp 127.

Figure 14A:
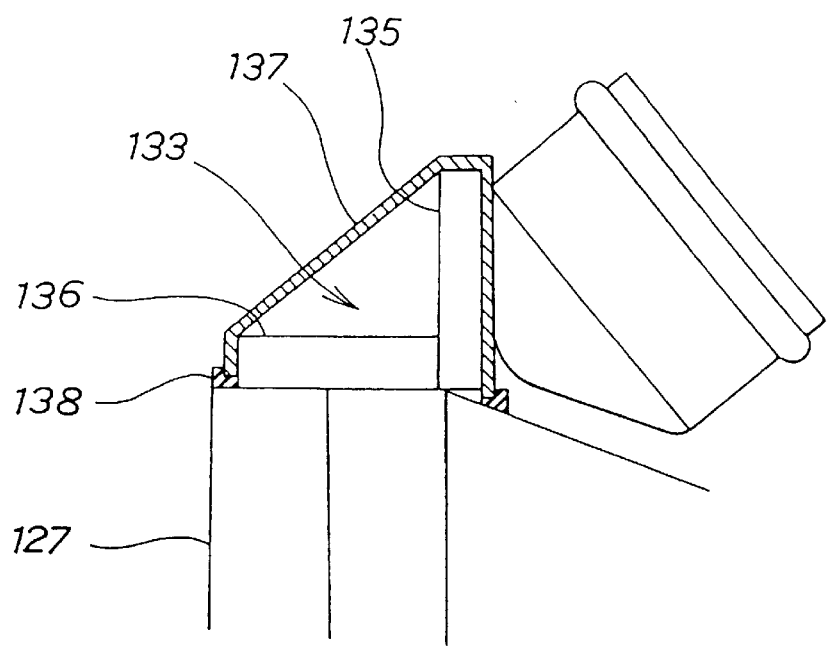
FIGS. 14(a) and 14(b) are views illustrating the antenna according to the third embodiment of the present invention.
Figure 14B:
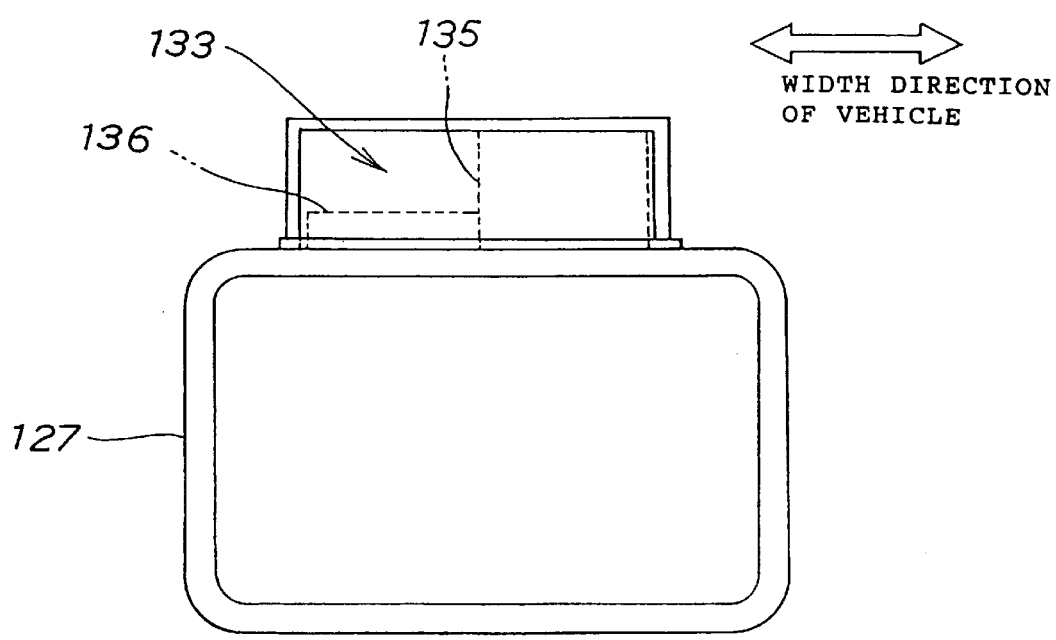

FIG. 14(a) is a side view, with parts partially cutaway, of the antenna according to the third embodiment of the present invention, and FIG. 14(b) is a front view of the antenna shown in FIG. 14(a). Referring to FIG. 14(a), the antenna 133 is composed of a first antenna 135 and a second antenna 136 disposed adjacently to each other. The first and second antennas 135 and 136 have the same structures of the first and second antennas 75 and 76 in the second embodiment, respectively.

The first antenna 135 has a forward directivity with respect to the running direction of the vehicle for communication with another vehicle, and the second antenna 136 has an upward directivity with respect to the running direction of the vehicle for receiving radio waves from artificial satellites.

As shown in FIG. 14(a), the first antenna 135 formed into a flat-shape is raised upright with its transmitting/receiving portion directed forwardly from the vehicle, and the second antenna 136 formed into a flat-shape is disposed in front of the first antenna 135 in such a manner as to lie in the horizontal direction with its receiving portion directed upwardly from the vehicle. The first and second antennas 135 and 136 are covered with a protective cover 137 made from a resin. In addition, reference numeral 138 designates a seal member for preventing permeation of dust and/or rain into the protective cover 137.

FIG. 14(b) shows a state in which the antenna 133 is mounted on an upper edge portion of the headlamp 127 formed into a square-shape in such a manner that the first and second antennas 135 and 136 are adjacently disposed on the right and left sides in the width direction of the vehicle. The disposition of the first and second antennas 135 and 136 on the right and left sides is effective to lower the height of the antenna 133. The function of the antenna 133 will be described below.

Figure 15:
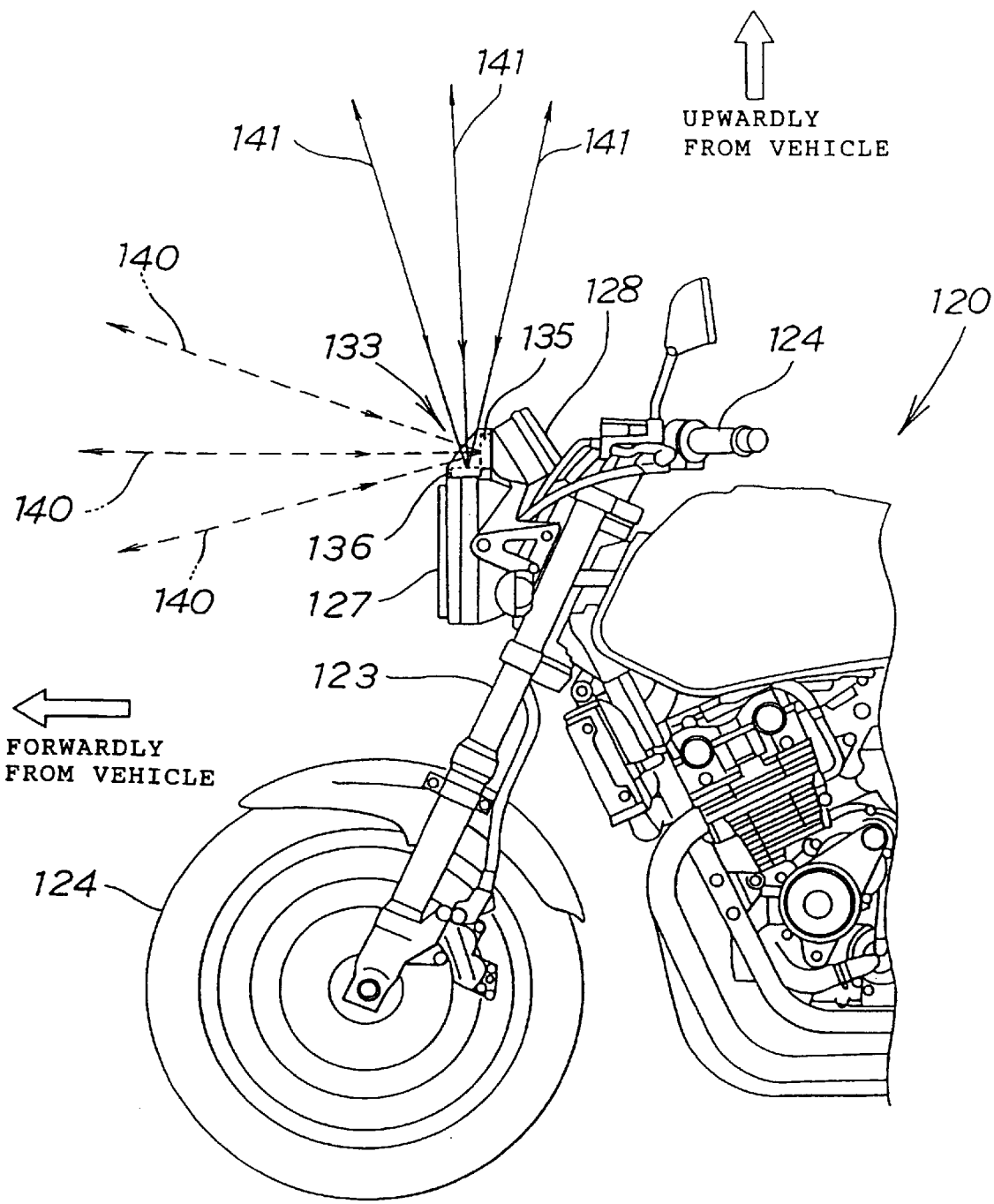
FIG. 15 is a view illustrating a function of the antenna according to the third embodiment of the present invention.

FIG. 15 is a view illustrating the function of the antenna according to the third embodiment of the present invention. In this Figure, there is shown a state in which the first antenna 135 of the antenna 133 transmits radio waves 140 to the front of the vehicle, or the first antenna 135 receives the radio waves 140 from the front of the vehicle and the second antenna 136 receives radio waves 141 from above of the vehicle.

With this configuration, a driver and/or a passenger riding on the motorcycle 120, and/or baggage loaded on a rear portion of the vehicular body do not interfere with the radio waves 140 transmitted from the antenna and the radio waves 141 received by the antenna 133.

As described above, the third embodiment of the present invention is characterized in that the antenna 133 is mounted to the upper edge portion of the headlamp 127. Since the antenna 133 is mounted on the upper edge portion of the headlamp 127, a reflection body such as a metal body from which radio waves are reflected, and/or an absorption body such as a human being which absorbs radio waves, are not present in the surroundings of the antenna 133, particularly, in front of and above the vehicle. As a result, it is possible to prevent a reduction in intensity of radio waves transmitted or received by the antenna 133.

The third embodiment of the present invention is also characterized in that the antenna 133 is composed of the first and second antennas 135 and 136 disposed adjacently to each other, wherein the first antenna 135 has the forward directivity with respect to the running direction of the vehicle and the antenna 136 has the upward directivity with respect to the running direction of the vehicle.

Since any obstacle to radio waves is not present in front of and above the vehicle, if the first antenna 135 is a transmitting/receiving antenna for radio communication with another vehicle and the second antenna 136 is a receiving antenna for the GPS, it is possible to desirably perform the radio communication with another vehicle running ahead of the vehicle concerned by the first antenna 135 and desirably receive radio waves from a number of artificial satellites by the second antenna 136, and hence to obtain accurate positional information of the vehicle concerned.

Further, since the first and second antenna 135 and 136 are disposed adjacently to each other, they can be contained in the compact containing space, and if the first and second antennas 135 and 136 are covered with the protective cover 137 (see FIG. 14(a)) for improving the weather resistance, the protective cover 137 can be miniaturized and thereby can be made inconspicuous. Since the first and second antennas 135 and 136 are not exposed and further the protective cover 137 is made inconspicuous as described above, it is possible to maintain a good external appearance of the vehicle.

Figure 16A:
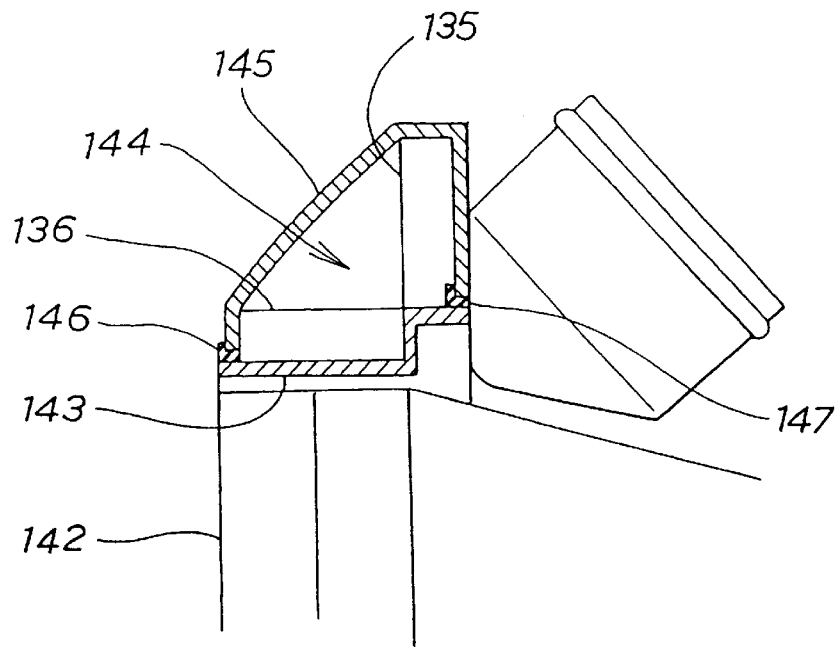
FIGS. 16(a) and 16(b) are views illustrating an antenna according to a fourth embodiment of the present invention.
Figure 16B:
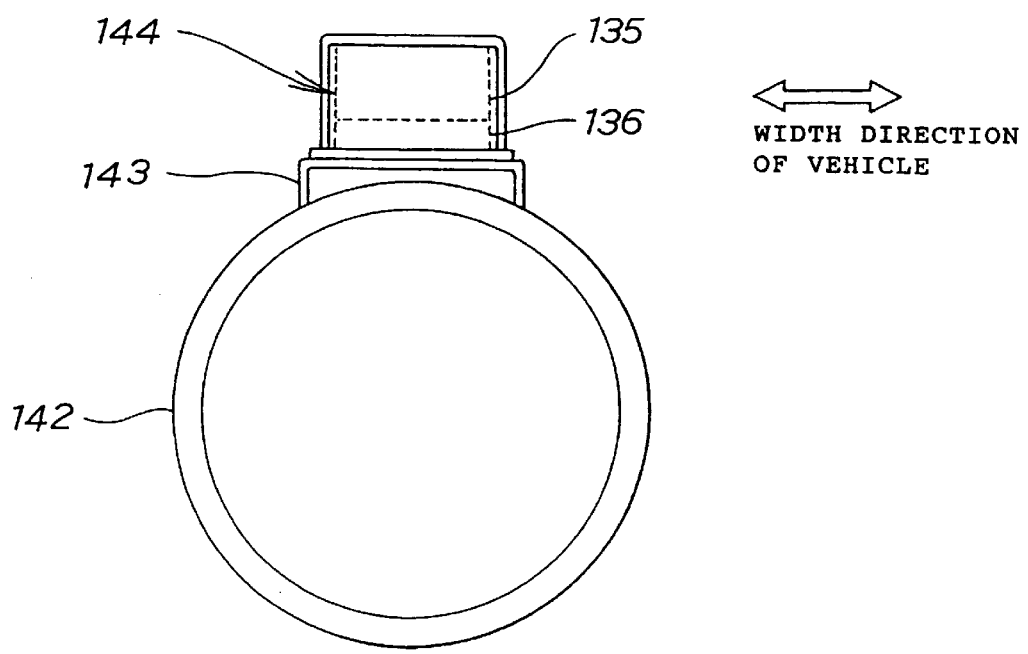

FIG. 16(a) is a side view, with parts partially cutaway, of an antenna according to a fourth embodiment of the present invention, and FIG. 16(b) is a front view of the antenna shown in FIG. 16(a). In these Figures, parts corresponding to those in the third embodiment are designated by the same reference numerals, and the overlapped description thereof is omitted.

In FIG. 16(a), there is shown a state in which a horizontal mounting base 143 is provided over a headlamp 142 and an antenna 144 is mounted on the mounting base 143, and the antenna 144 is covered with a protective cover 145. In addition, reference numerals 146 and 147 designate seal members for preventing permeation of dust and/or rain into the protective cover 145.

The antenna 144 is composed of a first antenna 135 and a second antenna 136 disposed adjacent to each other. The first antenna 135 is raised upright with its transmitting/receiving portion directed forwardly from the vehicle, and the second antenna 136 is disposed in front of and under the first antenna 135 in such a manner as to be lying in the horizontal direction with its receiving portion directed upwardly from the vehicle.

In FIG. 16(b), there is shown a state in which the mounting base 143 is mounted over the headlamp 142 formed into a round shape, and the first and second antenna 135 and 136 are positioned such that the widths in the horizontal direction, that is, in the width direction of the vehicle are made identical to each other. By positioning the first and second antenna 135 and 136 with the horizontal widths made identical to each other, the width of the antenna 144 can be shortened.

As described above, the fourth embodiment of the present invention is characterized in that the horizontal mounting base 143 is provided on an upper edge portion of the headlamp 142 or over the headlamp 142, and the antenna 144 is mounted on the mounting base 143. By matching the shape of the mounting base 143 to the shape of the upper portion of the headlamp 142, the antenna 144 can be easily mounted to the headlamp 142 irrespective of the shape of the headlamp 142. As a result, one kind of antenna can be applied to various kinds of motorcycles.

In the above embodiments, the present invention has been described by example of the scooter-type motorcycle, however, the present invention can be applied to a saddle-seat motorcycle. The saddle-seat motorcycle is classified into a type with a cowl and a type with no cowl. For the saddle-seat motorcycle with a cowl (which may be a full-cowl or a half-cowl), the cowl formed of a resin-molded product may be used in place of the front cover described in the above embodiments, and the antenna of the present invention may be built in the resin made cowl. For the saddle-seat motorcycle with no cowl, a resin cover may be prepared in place of the front cover described in the above embodiments. The resin made cowl or the resin cover is a resin-molded product equivalent to a front cover.

The antenna may be disposed outside the front cover insofar as the antenna be of a weather resisting structure. The object of the invention can be achieved only by disposing the antenna at a position being in front of and sufficiently separated from a driver. With this configuration, microwaves can be used for transmission and reception of signals because they are not obstructed by a driver and the like.

In the above embodiments, the antenna of the present invention is applied to radio communication between vehicles and to GPS navigation, however, the antenna is also applicable to communication using hand-free type movable telephones.

In the above embodiments, the antenna of the present invention is configured to have the forward directivity and upward directivity with respect to the running direction of the vehicle, however, the antenna may be configured to have a sideward directivity with respect to the running direction of the vehicle. The antenna having the sideward directivity can receive, for example, radio waves relevant to site information and road traffic information (traffic jam, construction zone, by-pass, weather information) transmitted from a transmitter disposed along a road.

In the second, third, and fourth embodiments, both the transmitting/receiving antenna for radio communication between vehicles and the receiving antenna for the GPS are mounted on the headlamp, however, either of the above antennas may be mounted on the headlamp. The disposition of the first and second antennas 135 and 136 in each of the third embodiment (see FIGS. 14(*a*) and 14(*b*)) and the fourth embodiment (see FIGS. 16(*a*) and 16(*b*)) may be applied to the disposition of the first and second antennas 75 and 76 in the second embodiment applied to the scooter-type motorcycle (see FIG. 6).

In the fourth embodiment, the antenna 144 is mounted to the headlamp 142 via the horizontal mounting base 143, however, an upper edge portion of the headlamp 142 may be formed into a horizontal plane and the antenna 144 be mounted on the horizontal plane.

The present invention having the above configuration exhibits several effects. According to the invention, there is provided an antenna disposition structure for a motorcycle including an antenna for radio communication, wherein the antenna is disposed over a headlamp and forwardly from a virtual slant line connecting the center of a handlebar to an axle of a front wheel. With this configuration, the antenna can be sufficiently separated from a driver of the motorcycle. A driver, who functions as a body absorbing radio waves, acts to weaken radio waves. According to this configuration, however, since the antenna is disposed forwardly from the slant line, it is possible to prevent the effect of absorption of radio waves by a driver and to prevent reductions in electromagnetic fields in the vertical and horizontal directions.

The antenna provided over the headlamp is located at a sufficiently high position, and such an antenna can ensure good line-of-sight of a large number of objects to or from which radio waves are transmitted or received without interference with obstacles on a road surface. As a result, the reliability of communication by means of the antenna can be enhanced.

The antenna may be covered with a resin made front cover or a resin-molded product equivalent thereto. With this configuration, the antenna can be mounted by making effective use of a space in the front cover, and the front cover formed of a resin-molded product allows the passing of radio waves therethrough, and can desirably protect the antenna. For example, the front cover prevents the antenna from being damaged due to rain and wind and being broken due to contact with another movable body. Further, since the antenna is not exposed from the front cover, it is possible to maintain a good external appearance of the vehicle.

The antenna may be mounted on an upper edge portion of the headlamp. With this configuration, since a reflection body such as a metal body from which radio waves are reflected, and/or an absorption body such as a human being which absorbs radio waves, are not present in the surroundings of the antenna, particularly, in front of and above the vehicle, it is possible to prevent a reduction in intensity of radio waves transmitted or received by the antenna.

A horizontal base may be provided on an upper edge portion of the headlamp or over the headlamp, and the antenna is mounted on the mounting base. With this configuration, the antenna can be easily mounted to the headlamp irrespective of the shape of the headlamp. As a result, one kind of antenna can be applied to various kinds of motorcycles.

The front cover may be provided under the handlebar, and a containing space provided in the front cover at a position over the headlamp. An opening communicated to the containing space may be provided in the front cover, the opening being covered with a lid. A horizontal mounting base may be provided, in the containing space, on an upper edge portion of the headlamp or over the headlamp, and the antenna is mounted on the mounting base. With this configuration, since the containing space is provided in the front cover, the antenna can be mounted by making effective use of the space in the front cover.

Since the front cover is made from a resin, it can protect the antenna while allowing the passing of radio waves therethrough. For example, the front cover prevents the antenna from being damaged due to rain and wind and being broken due to contact with another movable body. Since the antenna is disposed at a position higher than the headlamp, it can receive radio waves without interference with obstacles on a road surface. As a result, the reliability of communication by means of the antenna can be enhanced. Further, since the opening of the containing space is covered with the front lid, the maintenance for the antenna in the containing space can be easily performed.

The antenna has a forward directivity with respect to the running direction of the motorcycle. With this configuration, if the antenna is for radio communication between vehicles, since the antenna has the forward directivity, it can achieve desirable radio communication with another vehicle running ahead of the vehicle concerned.

The antenna may be composed of a first antenna and a second antenna disposed adjacent to each other, with the first antenna having a forward directivity with respect to the running direction of the motorcycle, and the second antenna having an upward directivity with respect to the running direction of the motorcycle. With this configuration, if the first antenna is a transmitting/receiving antenna for radio communication with another vehicle and the second antenna is a receiving antenna for the GPS, it is possible to desirably perform the radio communication with another vehicle running ahead of the vehicle concerned by the first antenna and desirably receive radio waves from a number of artificial satellites by the second antenna, and hence to obtain accurate positional information of the vehicle concerned.

Further, since the first and second antenna may be disposed adjacent to each other, they can be contained in a compact containing space. Further, if the first and second antennas are covered with a protective cover for improving the weather resistance, the protective cover can be miniaturized and thereby can be made inconspicuous. Since the first and second antennas are not exposed and further the protective cover is made inconspicuous as described above, it is possible to maintain a good external appearance of the vehicle.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An antenna disposition structure for a motorcycle comprising:
    an antenna for radio communication;
    a front cover for covering said antenna;
    a containing space provided in said front cover at a position over said headlamp; and
    a mounting base provided in said containing space,
    wherein said antenna is disposed over a headlamp and forwardly from a virtual slant line connecting the center of a handlebar to an axle of a front wheel, and said antenna is mounted on said mounting base.

2. The antenna disposition structure for a motorcycle according to claim 1, wherein said antenna is covered with a resin-made front cover or a resion-molded product.

3. The antenna disposition structure for a motorcycle according to claim 1, wherein said antenna has a forward directively with respect to the running direction of said motorcycle.

4. The antenna disposition structure for a motorcycle according to claim 1, wherein said antenna is composed of a first antenna and a second antenna disposed adjacent to each other; and
    said first antenna has a forward directivity with respect to the running direction of said motorcycle, and said second antenna has an upward directivity with respect to the running direction of said motorcycle.

5. The antenna disposition structure for a motorcycle according to claim 1, further comprising a front cover provided under said handlebar.

6. The antenna disposition structure for a motorcycle according to claim 1, wherein said containing space is provided n said front cover.

7. The antenna disposition structure for a motorcycle according to claim 1, further comprising a handle cover disposed behind a windshield for covering said handlebar, wherein said handle cover is provided with a case for containing a portable information storage/display unit for receiving and displaying information received from said antenna.

8. A motorcycle comprising:
    a front axle;
    a front wheel supported on said front axle;
    a handle bar for steering said front wheel;
    a headlamp mounted on said motorcycle;
    a horizontal mounting surface provided on said headlamp; and
    an antenna for receiving a signal, said antenna being disposed on said horizontal mounting surface,
    wherein at least a portion of said antenna is located forward of an imaginary line passing through a center of said handlebar and through a center of said front axle.

9. The motorcycle according to claim 8, further comprising:
    a mounting base attaching said antenna to said motorcycle, wherein said mounting base is located forward of the imaginary line.

10. The motorcycle according to claim 9, further comprising:
    a headlamp attached to a forward portion of said motorcycle, wherein said mounting base is attached to said motorcycle at a location adjacent to an upper edge of said headlamp.

11. The motorcycle according to claim 8, further comprising:
    a headlamp attached to a forward portion of said motorcycle, wherein said antenna extends above said headlamp.

12. The motorcycle according to claim 8, wherein said antenna includes a resin cover.

13. The motorcycle according to claim 8, wherein said antenna is directionally tuned to receive signals from a first direction, wherein said first direction faces substantially forward toward a normal travel direction of said motorcycle.

14. The motorcycle according to claim 8, wherein said antenna includes a first antenna element and a second antenna element.

15. The motorcycle according to claim 14, wherein said first antenna element is directionally tuned to receive signals from a first direction said second antenna element is directionally tuned to receive signals from a second direction, wherein said first direction faces substantially forward toward a normal travel direction of said motorcycle and said second direction faces substantially upward.

16. The motorcycle according to claim 8, wherein said horizontal mounting surface is provided on an upper edge portion of said headlamp.

17. The antenna disposition structure for a motorcycle according to claim 8, wherein said horizontal mounting surface is provided by a mounting base.

18. An antenna disposition structure for a motorcycle comprising:
    an antenna for radio communication; and
    a resin-made or resin molded front cover for covering said antenna, wherein said antenna is disposed over a headlamp and forwardly from a virtual slant line connecting the center of a handlebar to an axle of a front wheel, wherein said front cover is provided under said handlebar, a containing space is provided in said front cover at a position over said headlamp, an opening communicated to said containing space is provided in said front cover, said opening is covered with a lid, a horizontal mounting base is provided, in said containing space, on an upper edge portion of said headlamp or over said headlamp, and said antenna is mounted on said mounting base.

19. The antenna disposition structure for a motorcycle according to claim 18, further comprising a handle cover disposed behind the windshield for covering said handlebar.

20. The antenna disposition structure for a motorcycle according to claim 18, wherein said handle cover is provided with a case for containing a portable information storage/display unit for receiving and displaying information received from said antenna.

\* \* \* \* \*